(12) United States Patent
Himmelmann

(10) Patent No.: US 9,297,446 B2
(45) Date of Patent: Mar. 29, 2016

(54) ELECTRO-MECHANICAL ACTUATORS WITH INTEGRATED HIGH RESOLUTION WIDE OPERATING LOAD RANGE

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 175 days.

(21) Appl. No.: 13/952,989

(22) Filed: Jul. 29, 2013

(65) Prior Publication Data

US 2015/0027251 A1    Jan. 29, 2015

(51) Int. Cl.
*F16H 25/20* (2006.01)

(52) U.S. Cl.
CPC .... *F16H 25/2021* (2013.01); *F16H 2025/2087* (2013.01); *Y10T 74/18608* (2015.01)

(58) Field of Classification Search
CPC . F16H 25/2018; F16H 25/2015; F16H 25/20; F16H 25/2021; F16H 25/205; F16H 2025/2087; F16H 1/06; F16D 65/30; Y10T 74/1524; Y10T 74/1529; Y10T 74/1531; Y10T 74/1532; Y10T 74/16

USPC .......... 74/89, 89.23, 89.25, 89.27, 89.28, 74/89.31–89.34, 89.37–89.39; 475/149, 475/153, 254, 263, 265

See application file for complete search history.

(56) References Cited

U.S. PATENT DOCUMENTS

2010/0162837 A1* 7/2010 Cavalier et al. ............. 74/89.23
2010/0242642 A1* 9/2010 Ganter ........................ 74/89.23

FOREIGN PATENT DOCUMENTS

EP    2048413 A1    4/2009
EP    2343465 A1    7/2011

OTHER PUBLICATIONS

Extended European Search Report for European Patent Application No. 14178077.5, dated Mar. 24, 2015.

* cited by examiner

*Primary Examiner* — William Kelleher
*Assistant Examiner* — Jude Agendia
(74) *Attorney, Agent, or Firm* — Locke Lord LLP; Scott D. Wofsy; Arpita G. Buesing

(57) ABSTRACT

An electro-mechanical actuator with wide operating range load includes a shaft and a speed summed differential coupled to rotate the shaft. A prime mover is coupled to the speed summed differential and is configured to react to an output torque of the screw shaft. A torsional spring coupled to the speed summed differential by way of a rotary position sensor for detecting the rotation of the screw shaft thereby measuring the output torque of the shaft for control of the prime mover.

10 Claims, 3 Drawing Sheets

ELECTRO-MECHANICAL ACTUATORS WITH INTEGRATED HIGH RESOLUTION WIDE OPERATING LOAD RANGE

BACKGROUND OF THE INVENTION

1. Field of the Invention

The present invention relates to electro-mechanical actuators, and more particularly to a load feedback mechanism to measure small and large loads.

2. Description of Related Art

Throughout history, engineers have invented mechanisms that have had the capability to move objects. One particular category of these mechanisms is referred to as an actuator. Actuators can be designed to move objects in a rotary motion, or in a linear motion. A rotary actuator is simply a gearbox that either increases or decreases the rotational speed of a prime mover, typically a hydraulic motor, an internal combustion engine, a turbine engine, or an electric motor, to provide a desired level of rotational speed and torque at the output of the machine. Some examples of rotary actuators include: gearboxes, transmissions, differentials, hydraulic rotary actuators, and rotary electro-mechanical actuators. Linear actuators are machines designed to provide force and linear displacement to an object. Some examples of linear actuators include: rack and pinion actuators, hydraulic rams, ball screw actuators, and crank arm actuators.

Historically, hydraulic/pneumatic motors and hydraulic/pneumatic rams have been a primary source of power for both linear and rotary actuators. Hydraulic systems offer many advantages to the designer. These advantages include: high power density, accurate position control, low inertia (for high frequency response), and overload protection (via pressure relief valves).

In the last several decades, engineers have started to replace hydraulic/pneumatic actuation systems with electro-mechanical actuation systems. Electro-mechanical actuators offer increased efficiency over their hydraulic and pneumatic counterparts. Electro-mechanical actuators also eliminate the fire hazards and leakage potentials associated with the hydraulic fluids used in hydraulic actuation systems. However, one drawback to the traditional electro-mechanical actuators is they are unable to sense actuator output load across a large operating range, without comprising the actuator's structural stiffness. The traditional load sensor concept has a minimum sensed load capability that is about 5% to 10% of the maximum load.

Such conventional methods and systems have generally been considered satisfactory for their intended purpose. However, there is still a need in the art for improved actuator systems. There is also a need for such systems that are easy to make and use. The present disclosure provides a solution for these problems.

SUMMARY OF THE INVENTION

An electro-mechanical actuator with a wide operating range load, e.g. that has a feedback load mechanism that measures both small and large load, includes a shaft and a speed summed differential coupled to rotate the shaft. A prime mover is coupled to the speed summed differential and is configured to react to an output torque of the shaft. A torsional spring is coupled to the speed summed differential by way of a rotary position sensor for detecting the rotation of the shaft thereby measuring the output torque of the shaft for control of the prime mover.

In certain embodiments, the speed summed differential includes a first gear coupled to the screw shaft and a second gear coupled to the first gear. The torsional spring can be positioned between ground and the second gear such that the torsional spring rotates in response to the second gear. The rotary position sensor can detect the rotation of the torsional spring and is configured to report the rotation to a controller configured to utilize the rotary position sensor's calibration curve and determine the actuator's output load.

In another aspect, the shaft can be a screw shaft which produces linear motion in response to the rotation of the first and second gears. The linear motion of the screw shaft causes translation of a ball screw nut coupled thereto. It is also contemplated that the shaft can be a rotary output shaft.

In certain embodiments, an electro-mechanical actuator with wide operating range load includes a shaft, a first gear coupled to the shaft and a second gear coupled to the first gear. A prime mover is coupled to the first gear and is configured to measure an output torque of the first gear. A torsional spring is coupled to the second gear by way of a rotary position sensor for detecting the rotation of the torsional spring. A controller is coupled to the rotary position sensor configured to determine the actuator's output load. The controller utilizes a calibration curve to determine the actuator's output load.

In another aspect, the torsional spring can be positioned between ground and the second gear. The shaft can be a screw shaft which produces linear motion in response to the rotation of the first and second gears. It is also contemplated that the shaft can be a rotary output shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 3:
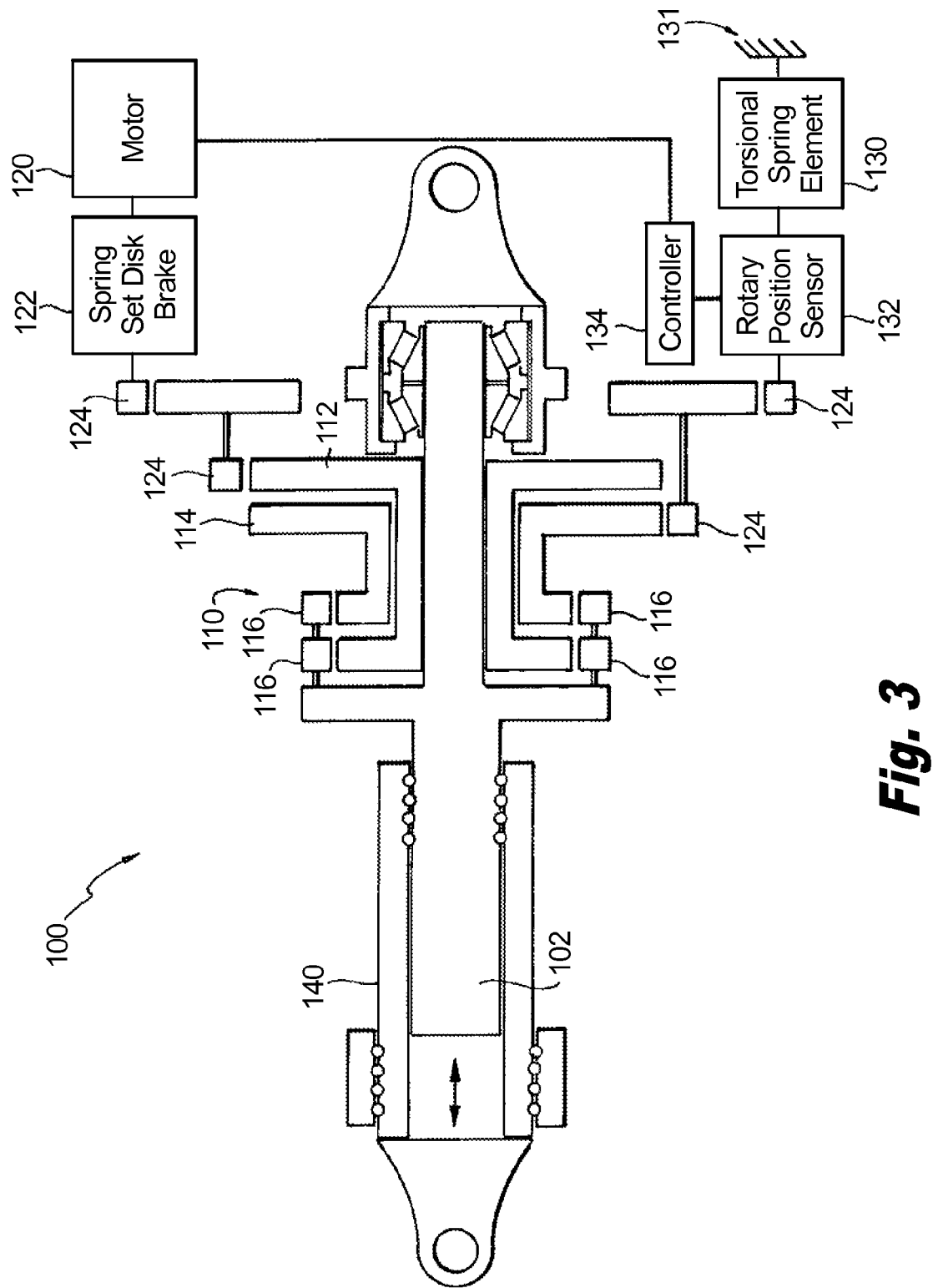
FIG. 3 is a schematic cross-sectional view of an exemplary embodiment of a linear electro-mechanical actuator.

Reference will now be made to the drawings wherein like reference numerals identify similar structural features or aspects of the subject disclosure. For purposes of explanation and illustration, and not limitation, a partial view of an exemplary embodiment of the electro-mechanical actuator in accordance with the disclosure is shown in FIG. 3. Other embodiments of the electro-mechanical actuator in accordance with the invention, or aspects thereof, are shown in FIG. 4.

Figure 1:
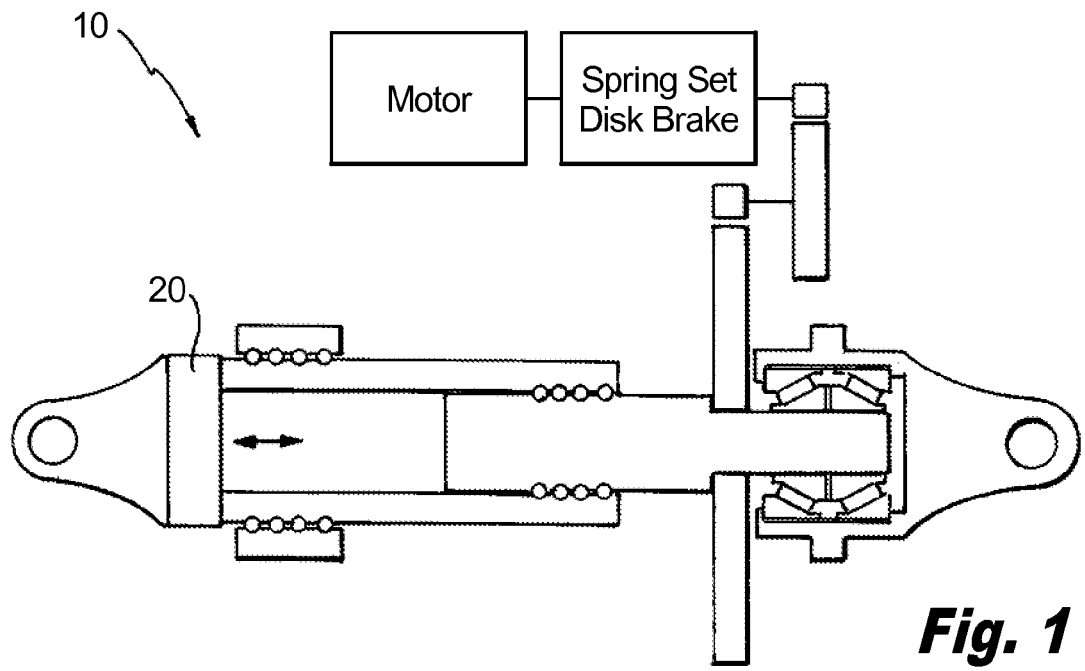
FIG. 1 is a schematic cross-sectional view of a linear electro-mechanical actuator known in the art.
Figure 2:
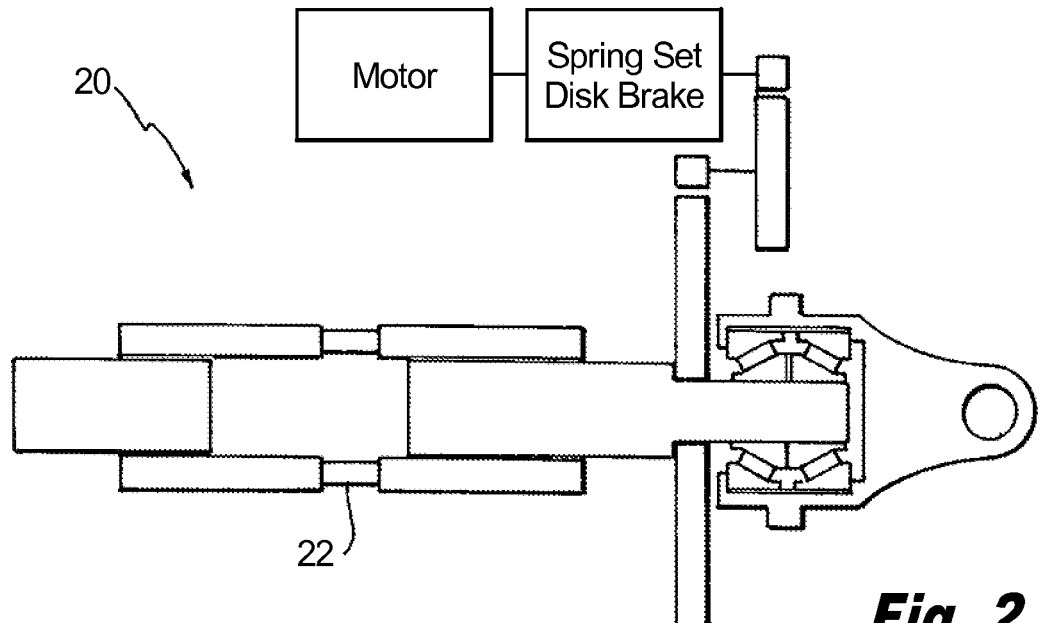
FIG. 2 is a schematic cross-sectional view of a rotary electro-mechanical actuator known in the art.

Referring first to FIGS. 1 and 2, there are illustrated electro-mechanical actuators with load feedback mechanisms known in the prior art. Historic actuators 10 and 20 place a linear (FIG. 1) or a rotary (FIG. 2) load sensor in the load path between the actuator and the load. This type of sensor can negatively impact the performance of the actuator. In order for the load sensor, shown in FIG. 1, to sense the applied force, it must deform a finite amount. This deformation is sensed by a strain gauge (or series of strain gauges). In order for the load cell 12 to be sensitive enough to sense small loads, the strain element in the load cell 12 must be structurally weak enough to deform under light loads. If the actuator exerts a large force on the weak load cell 12, it will plastically deform, which will alter the calibration curve of the load cell, destroying its accuracy. If the load cell 12 is designed to support the full load capacity of the actuator, it will not have the sensitivity to sense small loads. Similar effects are present for load cell 22 in FIG. 2.

A typical load cell can only operate accurately with a 10:1 turn down ratio. For example, if a load cell is designed for a maximum load of 1000 psi (1000 lbf/in$^2$), then it will not read accurately below 100 psi (100 lbf/in$^2$). If a rotary load cell is designed to sense a torque of 1000 psi (1000 lbf/in$^2$), it will not accurately read below 100 psi (100 lbf/in$^2$).

Figure 4:
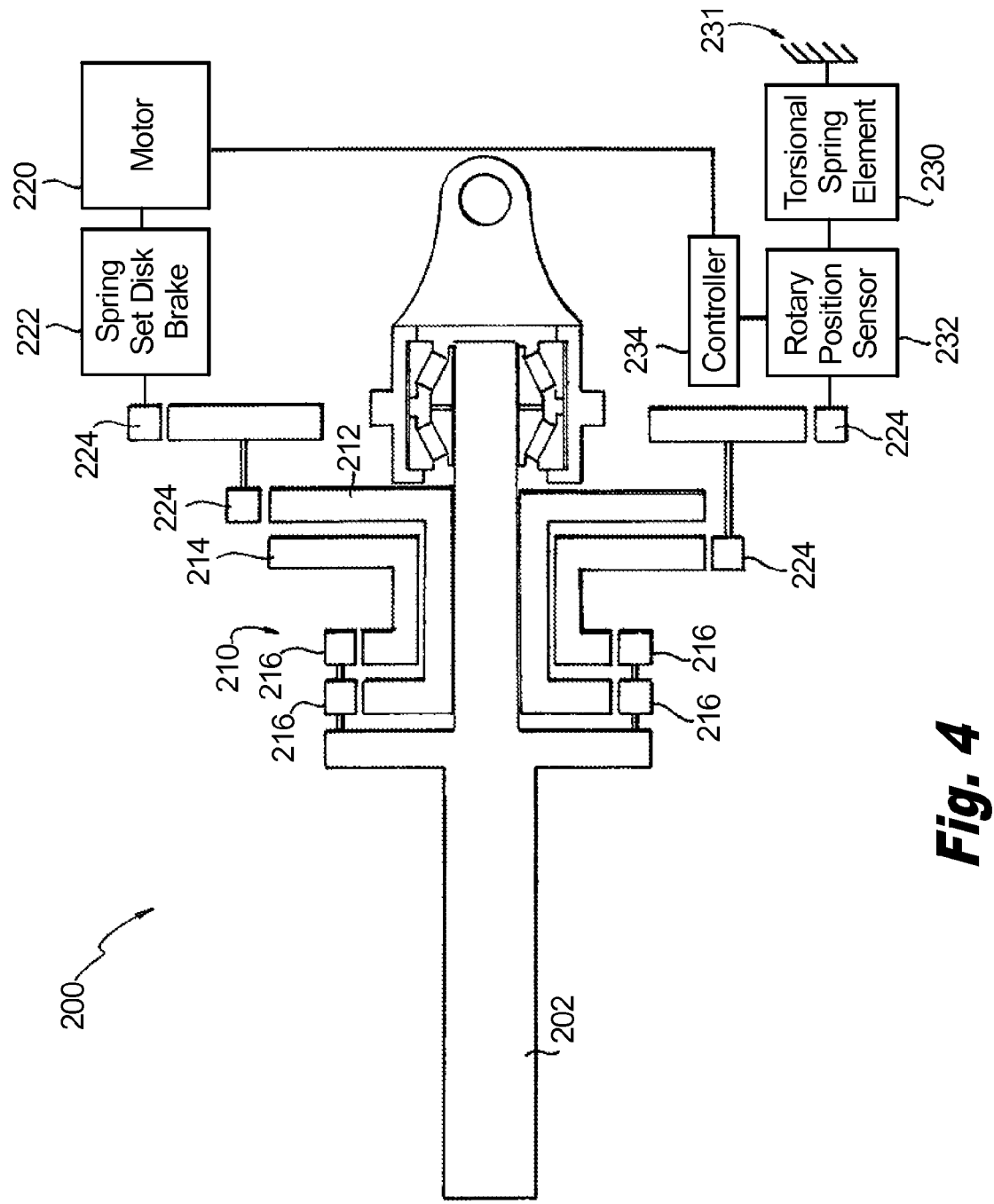
FIG. 4 is a schematic cross-sectional view of an exemplary embodiment of a rotary electro-mechanical actuator.

Referring now to FIGS. 3 and 4 illustrated electro-mechanical actuators (EMA) in accordance with the present disclosure. The EMAs utilize a speed summed differential in the load path between the prime mover and the actuator output to create a mechanical sensing point from which a rotary sensor (i.e. resolver, encoder, or the like) can be utilized in conjunction with a spring element to accurately sense the actuator load over a very wide operating range. The exemplary EMAs sense actuator output load across a large operating range, without compromising the actuators structural stiffness. The EMAs can be designed to sense all the way down to zero load.

As shown in FIG. 3, a linear EMA 100 is illustrated having a screw shaft 102 coupled to a speed summed differential 110. The speed summed differential 110 includes first and second gears 112, 114 coupled to the screw shaft 102 by way of respective planet gears 116. In this instance, a pair of planet gears 116 may be operatively associated with each of the first and second gears 112, 114. The centers of the planet gears 116 are fixed relative to the screw shaft 102.

A prime mover 120 is coupled to the speed summed differential 110 and more specifically, the prime mover 120 is coupled to the first gear 112. The prime mover may be an electric motor, a hydraulic motor, a pneumatic motor, or any other type of rotary power source. In operation, as the actuator load is increased, the output torque of the prime mover 120 will increase. The prime mover 120 is coupled to the first gear 112 by way of a spring brake 122 and at least one pinion gear system 124. As the output torque of the prime mover 120 increases, the torque on the first gear 112 will increase. As the torque on the first gear 112 increases, the torque on the second gear 114 will increase the same amount as the torque in pinion gears 124 will be the same to balance across the differential 110.

A torsional spring 130 couples between ground 131 and the second gear 114 and will rotate in response to the second gear 114. The torsional spring 130 is coupled to the second gear 114 of the speed summed differential 110 by way of a rotary position sensor 132. Similar to the spring brake 122, the rotary position sensor 132 is coupled to the second gear 114 by way of at least one pinion gear system 124.

As the torsional spring 130 rotates, the rotary position sensor 132 will detect the rotation and report it to a controller 134. The controller 134 is configured to utilize a calibration curve for the rotary position sensor 132 and determine the output load of the actuator 100. This type of system allows for a torsional spring element 130 that has a non-linear spring rate, allowing for large deflections at low load, while still having the capability to withstand very large loads. In this configuration, the sensor element is not required to deform with the straining part, like a strain gauge, making it easier to maintain the calibration of the sensor over the entire operating range.

As shown in FIG. 3, the rotational movement of the first and second gears 112, 114 causes linear motion of the screw shaft 102. In this embodiment, the rotational motion of the screw shaft 102, in turn, causes linear translation of a ball screw nut 140 coupled thereto. The displacement of the torsional spring 130 is correlated to the output torque of the motor 120.

With reference now to FIG. 4, a similar EMA 200 is shown for rotary motion. It will be understood that identical features shown and described in the previous embodiment may be utilized, or adapted by those skilled in the art. A rotary output shaft 202 is coupled to a speed summed differential 210 having a first gear 212 coupled to the shaft 202 and a second gear 214 operatively coupled the first gear 212. A prime mover i.e., PM motor 220, is coupled to the first gear 212 by way of a spring brake 222 and at least one pinion gear system 224. A torsional spring 230 is coupled between ground 231 and the second gear 214 by way of a rotary position sensor 232 and pinion gear system 234. Similar to the linear EMA 100, the rotary position sensor 232 of EMA 200 will detect the rotation of the torsional spring 230 and report the rotations to a controller 234. In this embodiment, the rotational motion of the shaft 202 remains as rotary output.

The methods and systems of the present disclosure, as described above and shown in the drawings, provide for electro-mechanical actuators with a feedback mechanism that allows for improved measurements over a wide range of loads. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An electro-mechanical actuator with wide operating range load, comprising:
   a screw shaft;
   a speed summed differential coupled to rotate the screw shaft;
   a prime mover coupled to the speed summed differential and configured to drive an output torque of the screw shaft;
   a torsional spring coupled to the speed summed differential by way of a rotary position sensor for detecting the rotation of the screw shaft thereby measuring the output torque of the screw shaft for control of the prime mover; and
   a controller connected to the rotary position sensor to detect the rotation of the torsional spring to determine the actuator's output load.

2. The electro-mechanical actuator of claim 1, wherein the speed summed differential includes a first gear coupled to the screw shaft and a second gear coupled to the first gear.

3. The electro-mechanical actuator of claim 2, wherein the torsional spring is positioned between ground and the second gear such that torsional spring rotates in response to the second gear.

4. The electro-mechanical actuator of claim 3, wherein the controller is configured to utilize a calibration curve to determine the actuator's output load.

5. The electro-mechanical actuator of claim 4, wherein the shaft is a screw shaft configured and adapted to produce linear motion in response to the rotation of the first and second gears.

6. The electro-mechanical actuator of claim 5, further comprising a ball screw nut operatively coupled to the screw shaft for translation of the ball screw nut in response to rotational motion of the screw shaft.

7. The electro-mechanical actuator of claim 4, wherein the shaft is a rotary output shaft.

8. The electro-mechanical actuator of claim 1, wherein the speed summed differential includes a first gear coupled to the shaft and a second gear coupled to the first gear.

9. The electro-mechanical actuator of claim 8, wherein the torsional spring is positioned between ground and the second gear.

10. The electro-mechanical actuator of claim 9, further including a prime mover coupled to the first gear and configured to drive the first gear.

* * * * *